(12) United States Patent
Kakiuchi

(10) Patent No.: US 6,745,300 B1
(45) Date of Patent: Jun. 1, 2004

(54) MAGNETIC DISK DEVICE AND DISK ACCESS METHOD THEREFOR

(75) Inventor: Tomio Kakiuchi, Saijo (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/647,891

(22) PCT Filed: Feb. 14, 2000

(86) PCT No.: PCT/JP00/00773

§ 371 (c)(1),
(2), (4) Date: Oct. 6, 2000

(87) PCT Pub. No.: WO00/48068

PCT Pub. Date: Aug. 17, 2000

(30) Foreign Application Priority Data

Feb. 15, 1999 (JP) .......................................... 11-035102

(51) Int. Cl.[7] .............................................. G06F 13/00
(52) U.S. Cl. ........................ 711/154; 711/112; 711/163; 711/167
(58) Field of Search ............................ 711/112, 4, 218, 711/137; 710/54

(56) References Cited

U.S. PATENT DOCUMENTS

| | | | | |
|---|---|---|---|---|
| 5,696,640 A | * | 12/1997 | Satoh | 360/48 |
| 5,729,718 A | * | 3/1998 | Au | 711/167 |
| 5,914,916 A | * | 6/1999 | Totsuka et al. | 369/30.1 |
| 6,018,788 A | * | 1/2000 | Ichikawa | 711/113 |
| 6,105,104 A | * | 8/2000 | Guttmann et al. | 360/61 |
| 6,249,854 B1 | * | 6/2001 | Fukuhisa et al. | |
| 6,427,184 B1 | * | 7/2002 | Kaneko et al. | 711/4 |

FOREIGN PATENT DOCUMENTS

| | | |
|---|---|---|
| JP | 61-156330 | 7/1986 |
| JP | 9-91098 | 4/1997 |

OTHER PUBLICATIONS

Ozden et al., "A Framework for the Storage and Retrieval of Continuous Media Data," 1995, pp 2–13.
XP–002139715, TW 321 765 A (Ind Technology Res Inst) Dec. 1, 1997, Abstract Only.

* cited by examiner

*Primary Examiner*—Reba I. Elmore
(74) *Attorney, Agent, or Firm*—Parkhurst & Wendel, L.L.P.

(57) ABSTRACT

Data can be transferred in a short time with the number of seeking operations reduced, and with the access unit to a magnetic disk defined as the number of sectors per track when a plurality of series of mass serial data are accessed by detecting whether or not access is performed in series according to a stored command history of the access to a plurality of series of mass storage file on a magnetic disk, and by actually accessing the magnetic disk not based on the data length requested by a command, but based on a track unit depending on the transfer state of each series when the seriality of the plurality of series is detected. Thus, the data transfer efficiency can be improved with the number of seeking operations reduced.

5 Claims, 4 Drawing Sheets

MAGNETIC DISK DEVICE AND DISK ACCESS METHOD THEREFOR

FIELD OF THE INVENTION

The present invention relates to a magnetic disk device known as a mass storage device using a magnetic disk as a storage medium, and to a disk access method therefor.

BACKGROUND OF THE INVENTION

Conventionally, in a computer system for controlling and managing office automation appliances, industrial machines and tools, etc., a mass storage device having a larger capacity has been required as a storage device for storing a larger volume of information data to be processed. As a mass storage device satisfying the requirements, a magnetic disk device using a magnetic disk as a storage medium is widely used.

The basic operations of the above described magnetic disk device when a file is transferred between the magnetic disk device and an upper device externally connected to the magnetic disk device are: interpreting a command issued by the upper device; having a head seek an optional track of a magnetic disk in the magnetic disk device according to the command; and reading and writing data to and from the magnetic disk based on the data length (number of sectors) requested by the upper device.

Described below will be mainly the operations of the above described conventional magnetic disk device.

FIG. 4 shows the operations of the conventional magnetic disk device. That is, FIG. 4 shows the process performed on a magnetic disk when an upper device simultaneously accesses two series of mass serial data located at different positions in the magnetic disk device.

In FIG. 4, a file (m–1)', a file (m), a file (m)' and a file (m+1)' form part of mass serial data (A), a file (n–1)', a file (n), a file (n)', and a file (n+1) form part of mass serial data (B), and each file has a data length at which the file can be processed by an upper device using one command.

When an upper device accesses a piece of mass serial data, it is necessary only to issue a command to sequentially access files. However, when the upper device simultaneously accesses two series of mass serial data, the upper device alternately issues a command to access each file of mass serial data (A), and a command to access each file of mass serial data (B) on a constant cycle (bandwidth).

In this case, the magnetic disk device interprets the contents of a command each time the command is received, and accesses a magnetic disk for data having a requested data length. That is, on the magnetic disk, the mass serial data (A) and the mass serial data (B) are alternately accessed. Files are accessed in the order of the file (m) by access (1), the file (m)' by access (1)', the file (n) by access (2), the file (n)' by access (2)', the file (m+1) by access (3), and the file (n+1) by access (4). That is, five seeking operations (1) through (5) are performed in accessing the files.

However, since an upper device cannot recognize the physical arrangement of the data on the magnetic disk in the above described conventional magnetic disk device, most accessing operations on the files forming mass serial data terminate before the track can be completely sought.

That is, when an upper device simultaneously accesses a plurality of series of mass serial data as described above, in the magnetic disk device, even in the case where there is an extremely high probability that the data following a target file on one and the same track can also be accessed, access to the last piece of data on the track is not performed, access to the track is terminated when access to the target file is terminated, and then a seeking operation to access another piece of mass serial data is performed. After accessing the other mass serial data, the magnetic disk device seeks the previous track, and accesses the remaining data on the track.

Therefore, there has been the problem that the times of seeking operations per unit data access increase, and deteriorate the data transfer efficiency.

The present invention has been developed to solve the above described conventional problem, and provides a magnetic disk device and a disk access method for the magnetic disk device to obtain the bandwidth required by an upper device without deteriorating the data transfer efficiency between a magnetic disk and buffer memory even if a plurality of series of mass serial data are accessed.

DISCLOSURE OF THE INVENTION

A magnetic disk is used as a storage medium in the magnetic disk device according to the present invention. The magnetic disk device accesses the magnetic disk, reds and writes data of various pieces of information and, when a plurality of series of mass serial data requiring a constant bandwidth such as picture data are transferred simultaneously at the plurality of series between the magnetic disk device and an externally connected upper device, includes a unit for: storing the history of commands issued from the upper device; stopping the access to the magnetic disk for data having the data length represented by the number of sectors requested by a command from the upper device when the comparison with the command history is performed on each command each time a command is received, and the seriality of a plurality of commands is detected; and accessing the magnetic disk in track units by defining the smallest access unit to the magnetic disk as the number of sectors per target track on the magnetic disk.

In addition, a magnetic disk is used as a storage medium in the disk access method for the magnetic disk device according to the present invention. The disk access method for the magnetic disk device accesses the magnetic disk, reads and writes data of various pieces of information and, when a plurality of series of mass serial data requiring a constant bandwidth such as picture data are transferred simultaneously at the plurality of series between the magnetic disk device and an externally connected upper device, includes the steps of: storing the history of commands issued from the upper device; stopping the access to the magnetic disk for data having the data length represented by the number of sectors requested by a command from the upper device when the comparison with the command history is performed on each command each time a command is received, and the seriality of a plurality of commands is detected; and accessing the magnetic disk in track units by defining the smallest access unit to the magnetic disk as the number of sectors per target track on the magnetic disk.

With the configuration and the method, the times of seeking operations can be reduced when mass serial data is accessed on a magnetic disk.

Furthermore, a magnetic disk is used as a storage medium in the magnetic disk device according to the present invention. The magnetic disk device accesses the magnetic disk through a buffer memory, reads and writes data of various pieces of information and, when a plurality of series of mass serial data requiring a constant bandwidth such as picture data are transferred simultaneously between the magnetic disk device and an externally connected upper device, includes a unit for: setting a data length for transfer to the magnetic disk in one accessing operation for each series based on the transfer state of each series obtained by a bandwidth required to transfer each of the various series of serial data obtained from the reception intervals of commands issued by the upper device, and by the size of an area to which the data can be transferred, and which is reserved in the buffer memory for the transfer of the data and based on the specification indicating an area size reserved in the buffer memory for the data transfer, the seeking time in the accessing operation, and the number of revolutions of the magnetic disk; and accessing data physically in series on the magnetic disk when each series of data is transferred to the magnetic disk.

Furthermore, a magnetic disk is used as a storage medium in the disk access method for the magnetic disk device according to the present invention. The disk access method accesses the magnetic disk through a buffer memory, reads and writes data of various pieces of information and, when a plurality of series of mass serial data requiring a constant band width such as picture data are transferred simultaneously between the magnetic disk device and an externally connected upper device, includes the steps of: setting a data length for transfer to the magnetic disk in one accessing operation for each series based on the transfer state of each series obtained by a band width required to transfer each of the various series of serial data obtained from the reception intervals of commands issued by the upper device, and by the size of an area to which the data can be transferred, and which is reserved in the buffer memory for the transfer of the data and based on the specification indicating an area size reserved in the buffer memory for the data transfer, the seeking time in the accessing operation, and the number of revolutions of the magnetic disk; and accessing data physically in series on the magnetic disk when each series of data is transferred to the magnetic disk.

With the configuration and the method, the number of seeking operations on a plurality of tracks used in accessing mass serial data on a magnetic disk can be reduced by physically in series accessing various series of data on a magnetic disk.

A magnetic disk is used as a storage medium in the magnetic disk device according to the present invention. The magnetic disk device accesses the magnetic disk, reads and writes data of various pieces of information, and includes: buffer memory storing plural pieces of data per command to be transferred to and from an upper device according to a command issued by the upper device externally connected to the magnetic disk device; a read/write control section for reading and writing data from and to the magnetic disk; command history storage means storing the history of a command when the command is received from the upper device; command seriality detection means for detecting the seriality of the received command according to the received command and the command history in the command history storage means when the command is received; a unit for measuring the reception interval of a plurality of commands whose seriality has been detected by the command seriality detection means; and a control unit for supplying to the read/write control section a read instruction and a write instruction for the data on the magnetic disk based on the data length independent of the commands from the upper device.

With the configuration, data can be transferred in a short time with the number of seeking operations reduced, and with the access unit to a magnetic disk defined as the number At sectors per track when a plurality of series of mass serial data are accessed by detecting whether or not access is performed in series according to a stored command history of the access to a plurality of series of mass storage file on a magnetic disk, and by actually accessing the magnetic disk not based on the data length requested by a command, but based on a track unit depending on the transfer state of each series when the seriality of the plurality of series. Thus, the data transfer efficiency can be improved with the number of seeking operations reduced.

EMBODIMENTS

The magnetic disk device and the disk access method according to the first embodiment of the present invention are described below by referring to the attached drawings.

Described first is the magnetic disk device according to an embodiment of the present invention.

Figure 1:
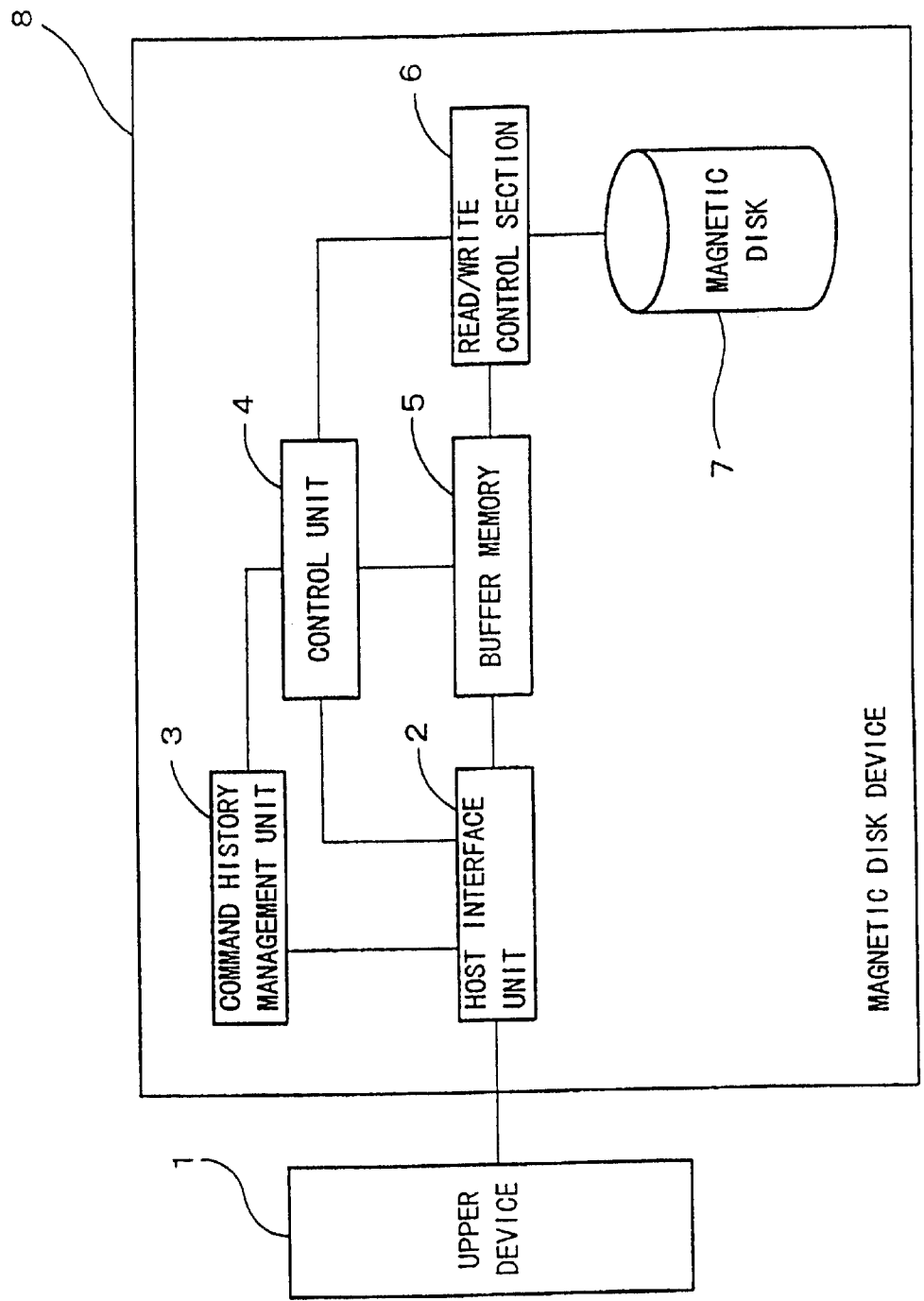
FIG. 1 is a block diagram of the basic configuration of the magnetic disk device according to an embodiment of the present invention.

FIG. 1 is a block diagram of the configuration of the magnetic disk device according to the present embodiment. In FIG. 1, an upper device 1 issues a command (data access request) to a magnetic disk device 8, and transfers data to and from the magnetic disk device 8.

The magnetic disk device 8 controls the interface of the upper device 1, and comprises: a host interface unit 2 for transmitting the reception of a command from the upper device 1 to a control unit 4; a command history management unit 3 for storing the command when the command is received from the upper device 1; a control unit 4 for detecting whether or not the seriality of the data by comparing the contents of the command history management unit 3 with the contents of the received command, and controlling the operations of the entire magnetic disk device 8; a buffer memory 5 for temporarily storing data transferred between the upper device 1 and a magnetic disk 7; a read/write control section 6 for reading and writing data for the magnetic disk 7; and the magnetic disk 7.

Described next is the disk access method used for the magnetic disk device according to an embodiment of the present invention.

First Embodiment

Figure 2:
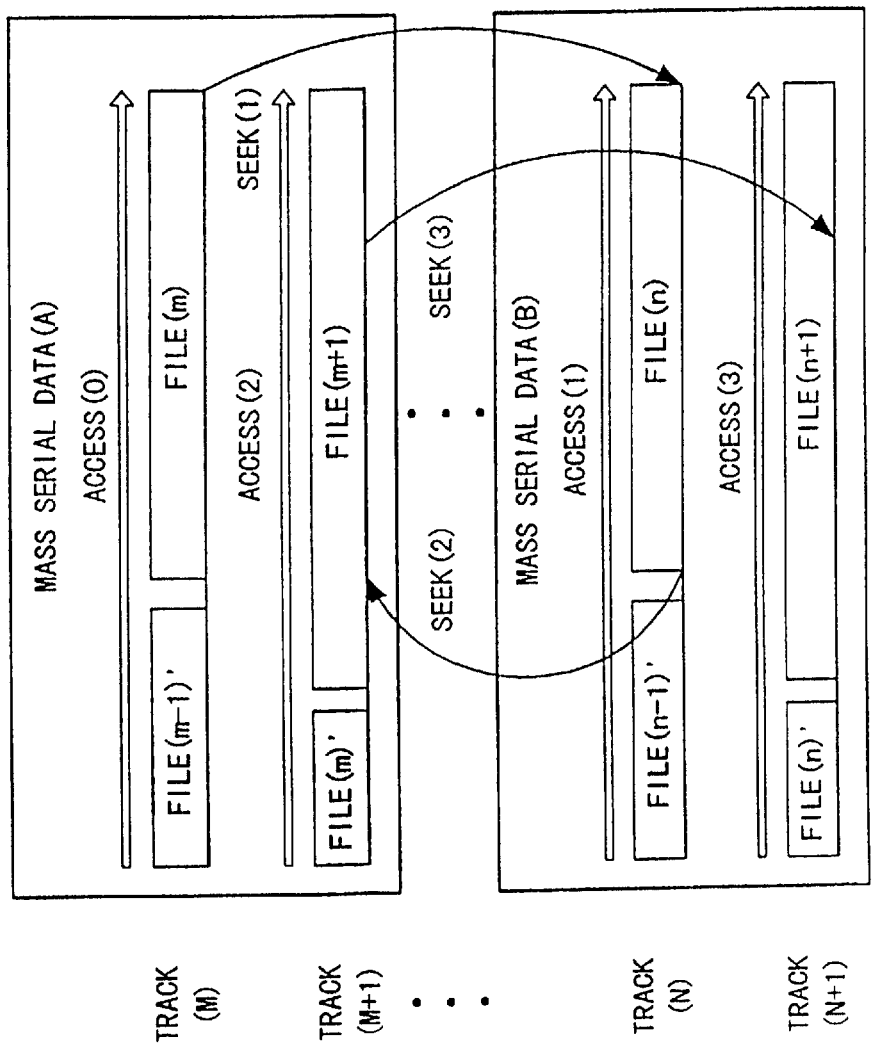
FIG. 2 shows an operation performed when two series of mass serial data are simultaneously accessed in the magnetic disk device according to the first embodiment of the present invention.

FIG. 2 shows a First Embodiment of the present invention, and shows the magnetic disk device shown in FIG. 1 and the disk access method used for the device. FIG. 2 practically shows the process performed on the magnetic disk 7 when the upper device 1 simultaneously accesses the two series of mass serial data stored at different positions in the magnetic disk 7 of the magnetic disk device 8.

A file (m−1)', a file (m), a file (m)', and a file (m+1) form part of the mass serial data (A) while a file (n−1)', a file (n), a file (n)', and a file (n+1) form part of the mass serial data (B). Each file has a data length to be processed by the upper device 1 at a time using one command.

When the upper device 1 simultaneously accesses two series of mass serial data, the upper device 1 alternately issues on a constant cycle a command to access each file of the mass serial data (A) and a command to access each file of the mass serial data (B).

The command to access each of the mass serial data (A) and (B) is stored in the command history management unit 3. The control unit 4 determines that two series of data are being accessed according to the contents of the command and the contents of the received command. The control unit 4 transmits an access instruction in track units to the read/write control section 6 when it is determined that serial data have been accessed. The read/write control section, 6 accesses the magnetic disk 7 in track units according to a received instruction.

On the magnetic disk 7, the mass serial data (A) and (B) are alternately accessed. The access is performed in the order of access (0) to the file (m−1)' and the file (m), access (1) to the file (n−1)' and the file (n), access (2) to the file (m)' and the file (m+1), and access (3) to the file (n)' and the file (n+1). The seeking operations (1) through (3) are performed between the accessing operations.

While five seeking operations are performed on the magnetic disk 7 in the conventional system, the data of the same size on the magnetic disk 7 can be accessed in the three seeking operations.

Thus, the necessary number of seeking operations can be reduced when mass serial data on the magnetic disk 7 is accessed.

As a result, the processing time required to reserve a data transfer area on the buffer memory 5 in transferring mass serial data can be shortened, and the bandwidth required by the upper device 1 can be reserved without lowering the data transfer efficiency between the magnetic disk 7 and the buffer memory 5.

Second Embodiment

Figure 3:
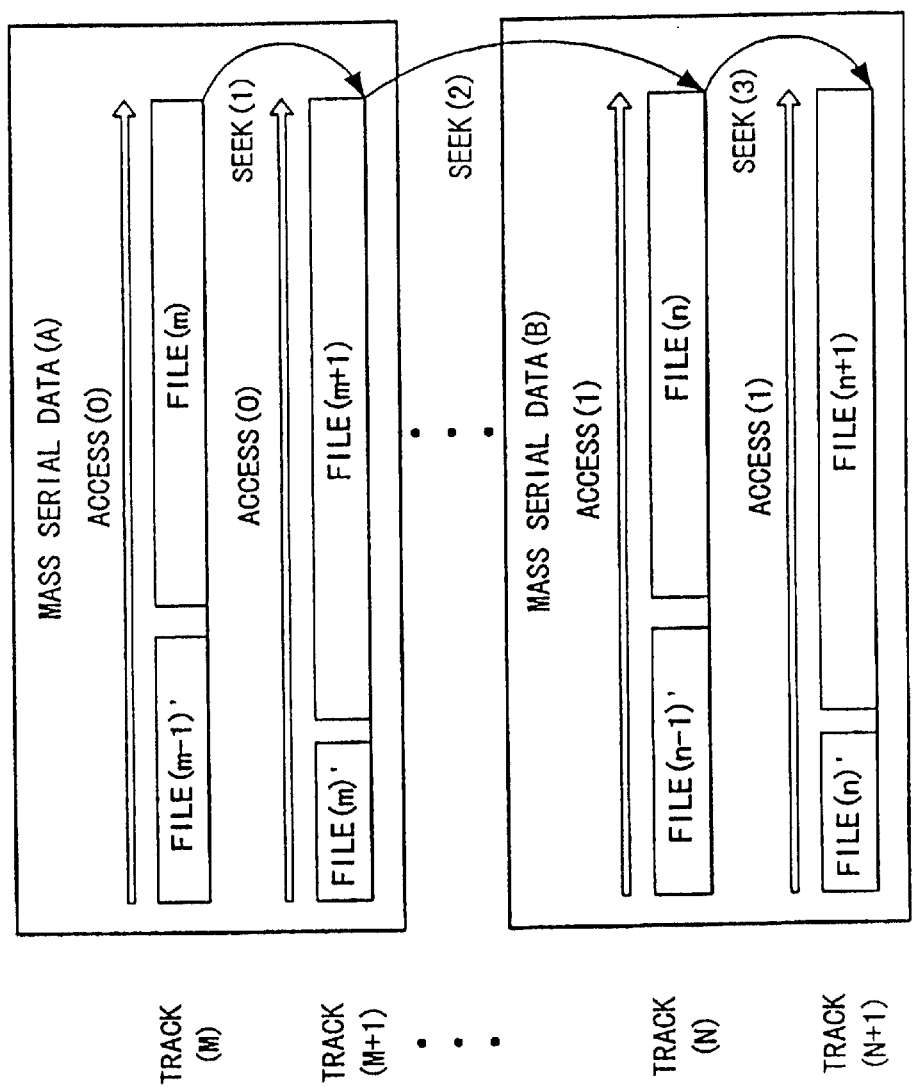
FIG. 3 shows an operation performed when two series of mass serial data are simultaneously accessed in the magnetic disk device according to the second embodiment of the present invention.
Figure 4:
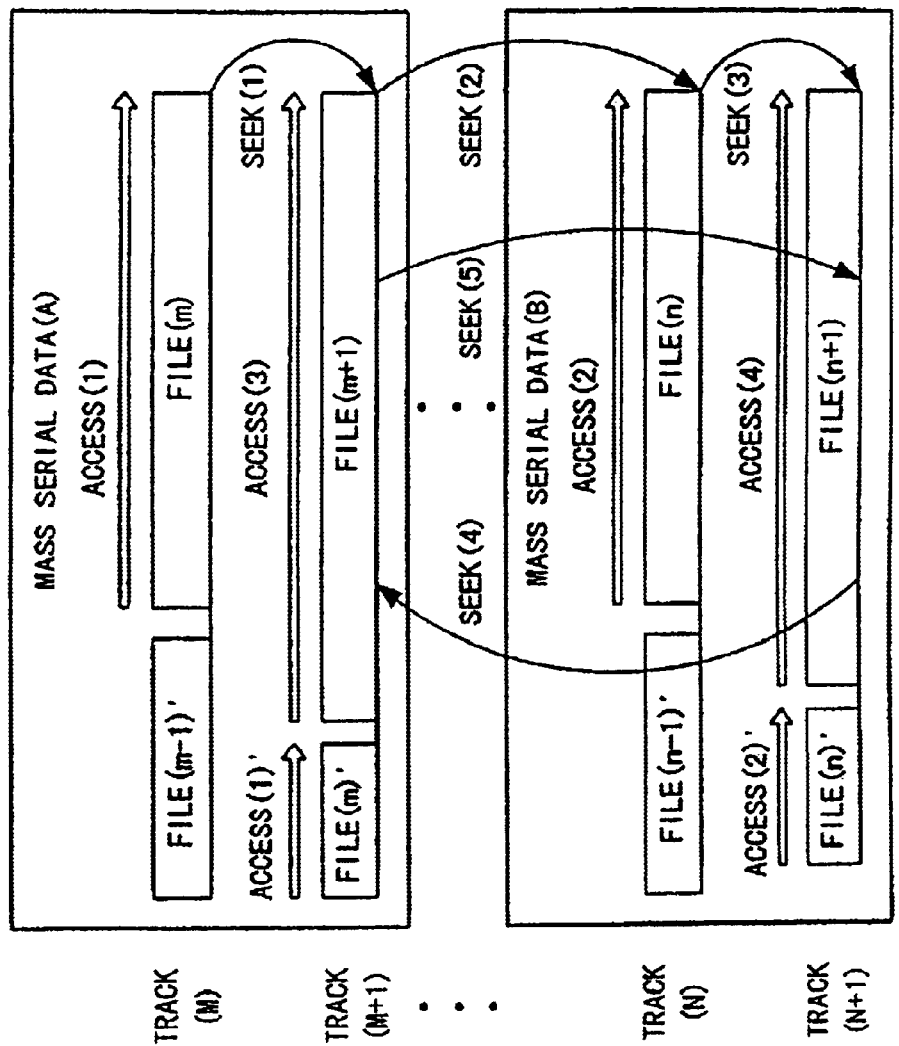
FIG. 4 shows an operation performed when two series of mass serial data are simultaneously accessed in the conventional magnetic disk device.

FIG. 3 shows a Second Embodiment of the present invention, and shows the magnetic disk device shown in FIG. 1 and the disk access method used for the device. FIG. 3 practically shows the process performed on the magnetic disk 7 when the upper device 1 simultaneously accesses the two series of mass serial data stored at different positions in the magnetic disk 7 of the magnetic disk device 8.

A file (m−1)', a file (m), a file (m)', and a file (m+1) form part of the mass serial data (A) while a file (n−1)', a file (n), a file (n)', and a file (n+1) form part of the mass serial data (B). Each file has a data length to be processed by the upper device 1 at a time using one command.

When the upper device 1 simultaneously accesses two series of mass serial data, the upper device 1 alternately issues on a constant cycle a command to access each file of the mass serial data (A) and a command to access each file of the mass serial data (B).

The command to access each of the mass serial data (A) and (B) is stored in the command history management unit 3. The control unit 4 determines that two series of data are being accessed according to the contents of the command and the contents of the received command. When it is determined that serial data have been accessed, the control unit 4 defines the data length transferred in one accessing operation on each series on the magnetic disk 7 as two tracks according to: the bandwidth necessary to transfer each series of data obtained by measuring the command reception interval for each series, the data transfer area size for each series in the buffer memory 5; and the specification relating to the data transfer stored in the magnetic disk device 8 (the size of the area reserved in the buffer memory 5 for data transfer, the seek time, and the number of revolutions), and transmits an instruction to access the magnetic disk 7 to the read/write control section 6.

The read/write control section 6 accesses the magnetic disk 7 in two track units according to a received instruction. On the magnetic disk 7, the mass serial data (A) and (B) are sequentially accessed. The access is performed in the order of access (0) from the file (m−1)' to the file (m+1), and access (1) from the file (n−1)' to the file (n+1). The seeking operations (1) through (3) are performed between the accessing operations.

While five seeking operations are performed on the magnetic disk 7 in the conventional system, the data of the same size on the magnetic disk 7 can be accessed in the three seeking operations. Further more, each of the seeking operations (1) and (3) in the three seeking operations can be performed as a one-track seeking operation in which the seeking operation can be completed in a time much shorter than the entire seek time taken for the seeking operation (2) in which a plurality of tracks are sought.

As described above, the necessary number of seeking operations on a plurality of tracks can be reduced when mass serial data on the magnetic disk 7 is accessed by accessing series of data in the magnetic disk 7 physically in series on the magnetic disk 7.

As a result, the processing time required to reserve a data transfer area on the buffer memory 5 in transferring mass serial data can be shortened, and the bandwidth required by the upper device 1 can be reserved without lowering the data transfer efficiency between the magnetic disk 7 and the buffer memory 5.

What is claimed is:

1. A magnetic disk device comprising:

means for reading and writing data by accessing a magnetic disk storage medium, and transferring to and from an external device connected to the magnetic disk device a plurality of series of mass serial data in a constant bandwidth and located serially on a plurality of tracks on such a disk;

means for:

storing a history of commands issued from an external device;

preventing transfer of data to and from a magnetic disk, such data having a data length represented by a number of sectors requested by a command from an external device when comparison with a command history is performed on each command each time a command is received, and seriality of a plurality of commands is detected; and accessing a magnetic disk in track units as a function of a smallest access unit to a magnetic disk as a number of sectors per target track on a magnetic disk.

2. A magnetic disk device comprising:

means for reading and writing data by accessing a magnetic disk storage medium through a buffer memory and transferring to and from an external device connected to the magnetic disk device a plurality of series of mass serial data in a constant bandwidth and located serially on a plurality of tracks on such a disk;

means for:
  storing a history of commands issued from an external device;
  setting a data length for transfer to a magnetic disk in one accessing operation for each series based on a transfer state of each series obtained by a bandwidth for transferring each of a plurality of series of serial data obtained from a reception interval of commands issued by an external device, and by a size of an area to which serial data can be transferred, and which is reserved in such buffer memory for transfer of such data, and as a function of a specification indicating an area size reserved in such buffer memory for the data transfer, a seeking time in an accessing operation, and a number of revolutions of a magnetic disk when comparison with the command history is performed on each command each time such command is received, and seriality of a plurality of commands is detected; and
  accessing data physically in series on a magnetic disk when each series of data is transferred to a magnetic disk.

3. A magnetic disk device for reading and writing data by accessing a magnetic disk storage medium, the disk device comprising:
  a buffer memory for storing plural pieces of data per command to be transferred to and from an external device according to a command issued by such an external device connected to the magnetic disk device;
  a read/write control section for reading and writing data from and to a magnetic disk;
  command history storage means for storing a history of a command when such a command is received from an external device;
  command seriality detection means for detecting seriality of a received command according to such received command and the command history in the command history storage means when such a command is received;
  means for measuring a reception interval of a plurality of commands whose seriality has been detected by the command seriality detection means; and
  a control unit for supplying to the read/write control section a read instruction and a write instruction for data on a magnetic disk based on a data length independent of a command from the external device, when the seriality of the received command is detected by the command seriality detection means.

4. A disk access method for a magnetic disk device comprising:
  reading and writing data by accessing a magnetic disk storage medium;
  transferring to and from an external device connected to the magnetic disk device a plurality of series of mass serial data in a constant bandwidth and located serially on a plurality of tracks on such disk;
  storing a history of commands issued from an external device;
  preventing transfer of data to and from the magnetic disk, such data having a data length represented by a number of sectors requested by a command from the external device when comparison with the command history is performed on each command each time the command is received, and seriality of a plurality of commands is detected; and
  accessing the magnetic disk in track units by defining a smallest access unit to the magnetic disk as a number of sectors per target track on the magnetic disk.

5. A disk access method for a magnetic disk device comprising:
  reading and writing data by accessing a magnetic disk storage medium through a buffer memory;
  transferring to and from an external device connected to the magnetic disk device a plurality of series of mass serial data in a constant bandwidth and located serially on a plurality of tracks on such disk;
  storing a history of commands issued from an external device;
  setting a data length for transfer to a magnetic disk in one accessing operation for each series based on a transfer state of each series obtained by a bandwidth required to transfer each of various series of serial data obtained from a reception interval of commands issued by an external device, and by a size of an area to which such serial data can be transferred, and which is reserved in the buffer memory for transfer of such data, and based on a specification indicating an area size reserved in the buffer memory for the data transfer, a seeking time in the accessing operation, and a number of revolutions of a magnetic disk, when comparison with the command history is performed on each command each time such command is received, and seriality of a plurality of commands is detected; and
  accessing data physically in series on a magnetic disk when each series of data is transferred to a magnetic disk.

* * * * *